Sept. 30, 1952    J. O. SEMMELMAN ET AL    2,611,958
ARTIFICIAL TEETH
Filed Jan. 24, 1950
FIG-1
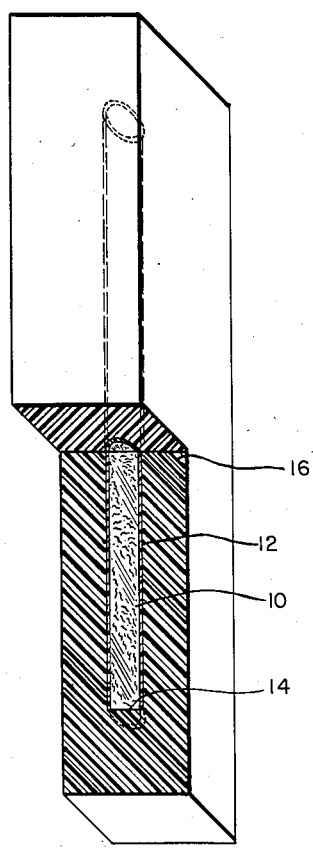
FIG-2
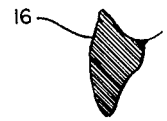
FIG-3
INVENTOR
JOHN O. SEMMELMAN
JOHN E. WATSON
BY
ATTORNEY

Patented Sept. 30, 1952

2,611,958

UNITED STATES PATENT OFFICE

2,611,958

ARTIFICIAL TEETH

John O. Semmelman and John E. Watson, York, Pa., assignors to The Dentists' Supply Company of New York, New York, N. Y., a corporation of New York Application January 24, 1950, Serial No. 140,284

5 Claims. (Cl. 32—8)

This invention relates to artificial teeth and a composition for making the same.

Glass fiber has been commonly used in the past as a strengthening or reinforcing constituent of a plastic article. Such previous utilizations of glass fiber for reinforcement have been for service in a dry condition or for service in a condition where accurate color-fastness is not essential. More recently such fiber has been utilized for artificial teeth not only to strengthen the product, but to increase the wearing qualities and impact resistance of a relatively soft synthetic plastic composition by the introduction of an abrasive glass, the glass fibers being coated to facilitate their incorporation in the plastic mass.

This procedure has had one main limitation prior to this invention, namely discoloration of the coating material due to the bleaching effect of water and dilute acids in the mouth, and a particular requirement of the dental profession is for color-fastness in spite of wet service conditions.

Many coatings for glass fiber have been used, the most common being starch. Resinous coatings tested were made from phenol formaldehyde, glycol dimethacrylate polyamide, butyl methacrylate, polyvinyl butyl, polyvinyl acetal and polyvinyl formal and combinations thereof. Most of these coatings result in adequate glass-plastic bond under dry conditions, many result in adequate bond under wet conditions, but none tested prior to this invention result in color-fastness under wet conditions.

An object of the present invention is to provide an improved coating for glass fiber which will serve as an effective bond or cement between the glass and the plastic.

Another object of the present invention is to provide an improved coating which will act as such a bond in spite of prolonged exposure to the aqueous environment and dilute acid solutions encountered in the human mouth.

A further object is to provide a coating which will meet the high requirements for color fastness established by the dental profession.

Other objects and advantages of the invention and a full understanding of the principles thereof will be apparent from the accompanying drawing and following description of a presently preferred embodiment of the invention.

In the drawings,

Figure 1 is a view partially in section of a fragment of artificial resin incorporating fiber bonded in accordance with our invention.

Figures 2 and 3 are sectional views showing teeth incorporating the end product of our invention.

For the purpose of reinforcing plastics designed for use in dental restorations it has been found to be desirable to use glass fibers between .00004 inch and .001 inch in diameter. These fibers, while still in the long filament form, are drawn through a bath containing diallyl diethoxysilane and a suitable solvent such as high flash naptha or Stoddard solvents. On emerging from this bath the solvent is allowed to evaporate, leaving the desired coating (diallyl diethoxysilane) in a sheath surrounding the fiber. The thickness of the coating may vary although in general it is desirable that it be quite thin, for example about .02% by weight of the fiber. After drying, the coated fiber is cut to the desired lengths of from 1/100 inch to about 1/4 inch. Cutting may be accomplished by hammermilling or any other known method. The end product, ready for impregnation with plastic is shown in cross section in Figure 1. Glass fiber 10 is thus sheathed on the sides only with coating 12. Ends 14 are exposed to the plastic matrix or impregnating agent 16.

Glass fiber, as thus prepared, is added as an inert filler to the plastic, in an amount from 1 to 25% by weight of the filled plastic. For best dispersal of the fiber it is preferred to use a viscous liquid or gelled form of the synthetic plastic materials, such as are described in the co-pending application of John E. Watson, S. N. 103,046 filed July 5, 1949 and entitled, Artificial Teeth and Compositions, Methods and Apparatus for Forming the Same.

The gel 16 as set forth in said application, is composed of a novel dental material or composition which when finally cured forms a thermoset copolymer having as a major constituent (about 50% or more by weight) an unsaturated polyester of a specific class copolymerized with an olefinically unsaturated monomer as a minor constituent. This copolymer has been found, according to this invention, to provide greatly improved properties or results particularly when used in the surface or enamel portion of a tooth and, when used in combination with a body part of a synthetic plastic which will readily adhere, fuse or bond to the denture base, for the composite tooth as a whole. Its composition can best be characterized as a thermosetting resin which when completely polymerized or cured is a copolymer of an olefinically unsaturated monomer containing at least one $>C=CH_2$ group with an unsaturated polyester of a dihydric alcohol and an alpha-beta ethylenically unsaturated dicarboxylic acid or anhydride. The unsaturated monomers are best typified by styrene, diallyl phthalate and vinyl acetate. The dihydric alcohols are typified by propylene glycol and ethylene glycol and the unsaturated dicarboxylic acids or anhydrides are best typified by maleic and fumaric, but itaconic and others are operable. Fibers are completely surrounded and wetted by such a viscous liquid giving full surface contact between coated fiber and plastic and the maximum bond possible.

It is further contemplated that other resinous material may be used in a manner similar to that set forth for the polyesters. For example, resinous materials from urea formaldehyde, melamine formaldehyde, phenol formaldehyde, silicone, etc. These resins, although unlike the polyester in composition, are thermosetting.

Molding of the reinforced plastic may continue according to methods commonly known to those skilled in the art.

While the drawing illustrates an embodiment of the invention as practiced, it will be understood that the invention might be applied, not only to glass fibers, but to powdered glass, powdered minerals such as feldspar, and particles or fibers of porcelain, metal and particles of aluminum oxide or silicon carbide.

It is further contemplated that other resinous compositions of the silicone group such as diallyl dimethoxysilane will prove as desirable in having properties specifically fitting them for use as a ceramic-plastic bond in the dental field.

By following the teaching of the present disclosure novel artificial teeth may be made which have greatly improved properties over all other plastic teeth reinforced with ceramic additions. Coatings as disclosed herein result in teeth with approximately six times better color fastness when exposed to moisture than any other coating tested under equal conditions. In addition, strength and abrasion resistance are improved by the water-proof, acid-proof bond which securely anchors the ceramic additions in the plastic matrix even after prolonged immersion in saliva or similar liquids. As shown in the drawings the teeth may be entirely formed from the plastic matrix as in Figure 3 or the matrix may be used only in those portions which are exposed in service as in Figure 2.

It is to be understood that the invention is not limited to the specific embodiment or the preferred form herein specifically illustrated and described, but may be used in other ways without departure from its spirit as defined by the following claims.

We claim:

1. A composition suitable for molding to form artificial teeth and comprising the copolymerization product of an olefinically unsaturated monomer containing at least one $>C=CH_2$ group and an unsaturated polyester resulting from the condensation of a dihydric alcohol with an alpha-beta ethylenically unsaturated dicarboxylic acid anhydride and containing 1 to 25% by weight of a filler coated with diallyl diethoxysilane.

2. A composition suitable for molding to form artificial teeth and comprising the copolymerization product of an olefinically unsaturated monomer containing at least one $>C=CH_2$ group and an unsaturated polyester resulting from the condensation of a dihydric alcohol with an alpha-beta ethylenically unsaturated dicarboxylic acid anhydride and containing 1 to 25% by weight of glass fibers coated with diallyl diethoxysilane.

3. An artificial tooth comprising the copolymerization product of an olefinically unsaturated monomer containing at least one $>C=CH_2$ group and an unsaturated polyester resulting from the condensation of a dihydric alcohol with an alpha-beta ethylenically unsaturated dicarboxylic acid anhydride containing 1 to 25% by weight of a filler coated with diallyl diethoxysilane.

4. An artificial tooth comprising the copolymerization product of an olefinically unsaturated monomer containing at least one $>C=CH_2$ group and an unsaturated polyester resulting from the condensation of a dihydric alcohol with an alpha-beta ethylenically unsaturated dicarboxylic acid anhydride containing 1 to 25% by weight of glass fibers coated with diallyl diethoxysilane.

5. A composition suitable for molding to form artificial teeth and comprising the copolymerization product of an olefinically unsaturated monomer containing at least one $>C=CH_2$ group and an unsaturated polyester resulting from the condensation of a dihydric alcohol with an alpha-beta ethylenically unsaturated dicarboxylic acid anhydride and containing 1 to 25% by weight of a filler coated with a resinous composition of the silicone group consisting of diallyl diethoxysilane and diallyl dimethoxysilane.

JOHN O. SEMMELMAN.
JOHN E. WATSON.

REFERENCES CITED

The following references are of record in the file of this patent:

UNITED STATES PATENTS

| Number | Name | Date |
| --- | --- | --- |
| 2,443,740 | Kropa | June 22, 1948 |
| 2,448,556 | Sprung et al. | Sept. 7, 1948 |